Patented Jan. 9, 1923.

1,441,598

UNITED STATES PATENT OFFICE.

MAX PHILLIPS, OF EVANSVILLE, WISCONSIN, AND GERALD H. MAINS, OF DETROIT, MICHIGAN.

PRODUCT MADE FROM FURFURAL AND PROCESS OF MAKING SAME.

No Drawing. Application filed March 21, 1921. Serial No. 454,226.

(FILED UNDER THE ACT OF MARCH 3, 1883, 22 STAT. L., 625.)

*To all whom it may concern:*

Be it known that we, MAX PHILLIPS and GERALD H. MAINS, citizens of the United States of America, and employees of the Department of Agriculture, residing in the city of Evansville, county of Rock, State of Wisconsin, and in the city of Detroit, county of Wayne, State of Michigan, respectively, have jointly invented certain new and useful Products Made from Furfural and Processes of Making Same, of which the following is a full, clear, and exact description.

This application is made under the act of March 3, 1883, chapter 143 (22 Stat. L., 624), and the invention herein described and claimed may be used by the Government of the United States, its officers and employees, and by any person in the United States, without payment to us of any royalty thereon. We hereby dedicate the same to the free use of the Government and the people of the United States.

Our invention relates to certain new resins formed by the action of various compounds on furfural, and to processes by means of which these resins are produced.

We shall now describe the resins that we have made and the processes for making them, without, however, limiting ourselves to the specific proportions of ingredients given, or to the specific conditions of temperature, pressure, or period of heating, as described, since we have found that these conditions may be varied over a considerable range without materially affecting the product.

The nine resins formed by the interaction of furfural and the following compounds, meta-nitroaniline, alpha-naphthylamine, para-toluidine, beta-naphthylamine, meta-toluylenediamine, methyl ethyl ketone ortho-toluidine, cymidine, and xylidine, will be described in turn.

1. One part by weight of furfural and two parts of meta-nitroaniline are heated together at 150° for one hour and 15 minutes at atmospheric pressure. The product when cooled at 25° C. is a black, hard, brittle resin.

2. One part by weight of furfural and two parts of alpha-naphthylamine are heated together at 200° C. for three hours at atmospheric pressure. The product when cooled to 25° C. is a black, hard, brittle resin.

3. One part by weight of furfural and two parts by weight of para-toluidine are heated together at 150° C. for two and one-half hours at atmospheric pressure. The product when cooled to 25° C. is a black, hard, brittle resin.

4. One part by weight of furfural and two parts of beta-naphthylamine are mixed together at room temperature, about 25° C. A reddish brown, hard, brittle resin is formed immediately.

5. Equal parts by weight of furfural and meta-toluylenediamine are mixed together at room temperature, about 25° C. The product is allowed to stand for several hours. A dark brown, hard, brittle resin is formed.

6. Five parts by weight of furfural, two parts of methyl ethyl ketone, and five parts of 50 per cent sodium hydroxid solution are mixed together at room temperature, about 25° C. Considerable heat is liberated during the reaction and a dark brown resin is formed. By washing out the excess alkali with water and dilute acid, and drying the product at 100° C., a brown resin is formed, becoming hard and brittle at 25° C.

7. Five parts by weight of furfural, ten parts of orthotoluidine, and one part of hydrochloric acid (specific gravity 1.19) are heater together at 150° for one hour. The product when cooled to 25° C. is a black, very hard, brittle resin.

8. Five parts by weight of furfural, five parts of cymidine ($1CH_3.2NH_2.4$ isopropyl benzene) and one part of of hydrochloric acid (specific gravity 1.19) are heated together at 150° for 10 minutes. The product when cooled to 25° C. is a reddish brown, hard, brittle resin.

9. Five parts by weight of furfural, five parts of xylidine (crude mixed xylidines) and one part of hydrochloric acid (specific gravity 1.19) are heated together at 150° C. for 15 minutes. The product when cooled to 25° C. is a dark red, almost black, hard brittle resin.

These resins do not have sharp fusion points, but soften gradually until fluid. The softening temperatures of the resins when made as described lie between 30° and 100°

C., but this softening point can be raised to almost any temperature below 150° C. by simply heating the resins at a higher temperature, or for a longer period of time, either during the formation or after they are formed.

We have found that the resins from furfural and ortho-toluidine, cymidine, and xylidine can not be formed at atmospheric pressure and temperatures up to 200° C. without the presence of a catalyst. We have found hydrochloric acid to be a very effective catalyst in forming these resins. Its salts are also catalysts for this purpose but not quite as effective. Other halogen acids and their salts also serve as catalysts. The use of these catalysts in the formation of resins from furfural and meta-nitroaniline, alpha-naphthylamine, and para-toluidine shortens the period of heating and lowers the temperature necessary to the formation of the resins.

The above resins are all practically insoluble in water. They are somewhat soluble in turpentine, quite soluble in benzene, acetone, and alcohol, and very soluble in furfural. The benzene, acetone, and furfural solutions of these resins form varnish stains suitable for application to wood. These resins are suitable for the manufacture of varnishes by compounding with oils by the methods commonly practiced in the varnish industry. By the application and baking of several coats of the furfural solutions of the furfur-ortho-toluidine, furfur-cymidine, furfur-alpha-napthylamine, and furfur-xylidine resins black enameled surfaces are formed.

Furfural, the main material entering into the formation of these resins, is an aldehyde which can be manufactured very cheaply and readily from corn-cobs and other waste products containing pentosans. Hence the resins can be manufactured at a low cost.

Having thus described our invention, we claim:

1. An amorphous composition of matter comprising the product of reaction between furfural and meta-nitroaniline having qualities characteristic of a soluble resin.

2. An amorphous composition of matter comprising the product of reaction between furfural and alpha-naphthylamine having qualities characteristic of a soluble resin.

3. An amorphous composition of matter comprising the product of reaction between furfural and para-toluidine having qualities characteristic of a soluble resin.

4. An amorphous composition of matter comprising the product of reaction between furfural and beta-napthylamine having qualities characteristic of a soluble resin.

5. An amorphous composition of matter comprising the product of reaction between furfural and meta-toluylenediamine having qualities characteristic of a soluble resin.

6. An amorphous composition of matter comprising the product of reaction between furfural and methyl ethyl ketone and sodium hydroxid having qualities characteristic of a soluble resin.

7. An amorphous composition of matter comprising the product of reaction between furfural and ortho-toluidine in the presence of a halogen-acid catalyst having qualities characteristic of a soluble resin.

8. An amorphous composition of matter comprising the product of reaction between furfural and cymidine in the presence of a halogen-acid catalyst having qualities characteristic of a soluble resin.

9. An amorphous composition of matter comprising the product of reaction between furfural and xylidines in the presence of a halogen-acid catalyst having qualities characteristic of a soluble resin.

10. A process for the manufacture of a resin consisting in heating together furfural and meta-nitroaniline in approximate proportions of one part by weight of furfural to two parts by weight of meta-nitroaniline.

11. A process for the manufacture of a resin, consisting in heating of furfural and alpha-napthylamine in approximate proportions of one part by weight of furfural to two parts by weight of alpha-napthylamine.

12. A process for the manufacture of a resin, consisting in mixing together substantially one part by weight of furfural and two parts of beta-napthylamine at ordinary room temperatures.

13. A process for the manufacture of a resin, consisting in mixing together substantially equal parts by weight of furfural and meta-toluylenediamine at room temperature and allowing the product to remain at that temperature until hard.

14. A process for the manufacture of a resin, consisting in heating together furfural and ortho-toluidine in the presence of a halogen acid as a catalyst.

15. A process for the manufacture of resins, consisting in heating together furfural and alpha-napthylamine in the presence of a halogen acid as a catalyst.

16. A process for the manufacture of a resin, consisting in heating together furfural and cymidine in the presence of a halogen acid as a catalyst.

17. A process for the manufacture of resins, consisting in heating together furfural and beta-napthylamine in the presence of a halogen acid as a catalyst.

18. A process for the manufacture of a resin, consisting in heating together furfural and xylidines in the presence of a halogen acid as a catalyst.

19. A process for the manufacture of resins, consisting in heating together furfural and para-toluidine in the presence of a halogen acid as a catalyst.

20. A process for the manufacture of resins, consisting in heating together furfural and meta-nitroaniline in the presence of a halogen acid as a catalyst.

21. A process for the manufacture of resins, consisting in heating together furfural and meta-toluylenediamine in the presence of a halogen acid as a catalyst.

22. A resinous condensation product of furfural and a homologue of aniline, insoluble in water and soluble in benzene and furfural and capable of becoming hard and brittle by heat treatment.

23. A process for the manufacture of a resin, consisting in heating together furfural and para-toluidine in approximate proportions of one part by weight of furfural to two parts by weight of para-toluidine.

24. A process for the manufacture of resins, which comprises heating together furfural and a homologue of aniline in the presence of a halogen acid as a catalyst.

25. An amorphous composition of matter, comprising the product of reaction between furfural and a napthylamine having qualities characteristic of a soluble resin.

In testimony whereof, we affix our signatures in the presence of two subscribing witnesses.

MAX PHILLIPS.
GERALD H. MAINS.

Witnesses:
JOSEPH A. AMBLER,
L. A. SKINNER.